United States Patent
Shine, Jr.

(10) Patent No.: US 10,781,648 B2
(45) Date of Patent: Sep. 22, 2020

(54) THIXOTROPIC CEMENT SLURRY AND PLACEMENT METHOD TO CURE LOST CIRCULATION

(71) Applicant: Saudi Arabian Oil Company, Dhahran (SA)

(72) Inventor: Joseph Michael Shine, Jr., Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/529,146

(22) Filed: Aug. 1, 2019

(65) Prior Publication Data

US 2019/0352983 A1  Nov. 21, 2019

Related U.S. Application Data

(63) Continuation of application No. 16/154,248, filed on Oct. 8, 2018, now Pat. No. 10,415,330.

(Continued)

(51) Int. Cl.
*E21B 21/00* (2006.01)
*C09K 8/42* (2006.01)
(Continued)

(52) U.S. Cl.
CPC ............ *E21B 21/003* (2013.01); *C04B 28/04* (2013.01); *C04B 28/26* (2013.01); *C09K 8/426* (2013.01);
(Continued)

(58) Field of Classification Search
CPC .... E21B 21/003; E21B 166/292; E21B 33/16; C09K 8/426; C09K 8/487; C09K 8/424
See application file for complete search history.

(56) References Cited

U.S. PATENT DOCUMENTS 3,831,383 A * 8/1974 Crank ................. E21B 33/13
405/264
3,928,052 A  12/1975 Clement
(Continued)

FOREIGN PATENT DOCUMENTS

WO  9839592 A2  9/1998

OTHER PUBLICATIONS

International Search Report and Written Opinion dated Jan. 17, 2019 pertaining to International application No. PCT/US2018/054832 filed Oct. 8, 2018.

(Continued)

*Primary Examiner* — Silvana C Runyan
(74) *Attorney, Agent, or Firm* — Dinsmore & Shohl (57) ABSTRACT

Embodiments of methods for reducing lost circulation in a wellbore comprise inserting a conduit comprising a first and second end and an outer diameter and an inner diameter into the wellbore, and pumping a thixotropic cement slurry, wherein the thixotropic cement slurry will increase in viscosity with no shear and decrease in viscosity with shear, and have a power law exponent value of less than or equal to 0.3 when the thixotropic cement slurry has a density of greater than 12.69 pounds per gallon, through the conduit into the wellbore, in which the thixotropic cement slurry comprises at least one cement, at least one viscosifier, mix water, and one or more than one strength accelerating additives. The method further comprises allowing the thixotropic cement slurry to harden in the wellbore to create a plug, removing the conduit from the wellbore, and reducing lost circulation via the plug in the wellbore.

17 Claims, 2 Drawing Sheets

Related U.S. Application Data (60) Provisional application No. 62/570,383, filed on Oct. 10, 2017.

(51) Int. Cl.
| | |
|---|---|
| *C09K 8/487* | (2006.01) |
| *C04B 28/04* | (2006.01) |
| *C04B 28/26* | (2006.01) |
| *E21B 33/16* | (2006.01) |

(52) U.S. Cl.
CPC .............. *C09K 8/487* (2013.01); *C09K 8/424* (2013.01); *E21B 33/16* (2013.01)

(56) References Cited

U.S. PATENT DOCUMENTS

| | | | |
|---|---|---|---|
| 3,959,003 | A | 5/1976 | Ostroot et al. |
| 4,102,400 | A | 7/1978 | Crinkelmeyer et al. |
| 4,235,291 | A | 11/1980 | Messenger |
| 4,275,788 | A * | 6/1981 | Sweatman ............... C09K 8/42 166/285 |
| 4,498,534 | A | 2/1985 | Lindsey |
| 4,515,216 | A | 5/1985 | Childs et al. |
| 4,822,421 | A | 4/1989 | Crabb |
| 6,073,694 | A * | 6/2000 | Crawshaw .............. E21B 33/13 166/292 |
| 6,244,344 | B1 | 6/2001 | Chatterji et al. |
| 6,610,140 | B2 | 8/2003 | Vijn et al. |
| 7,669,653 | B2 | 3/2010 | Craster et al. |
| 8,215,405 | B1 | 7/2012 | Carrascal |
| 8,235,116 | B1 | 8/2012 | Buds, Jr. et al. |
| 8,307,899 | B2 | 11/2012 | Brenneis et al. |
| 9,228,993 | B2 | 1/2016 | Shine, Jr. et al. |
| 2002/0134283 | A1 | 9/2002 | Vijn et al. |
| 2004/0238218 | A1 | 12/2004 | Runia et al. |
| 2014/0174192 | A1 | 6/2014 | Shine, Jr. et al. |
| 2017/0369758 | A1 | 12/2017 | Pisklak et al. |

OTHER PUBLICATIONS

Almagro et al., Sealing Fractures: Advances in Lost Circulation Control Treatments, Oilfield Review, Autumn, vol. 26, No. 3, pp. 1-13, May 21-23, 2014.

Godoy et al., "Successful Cementing Through Bottomhole Drilling Assemblies", Society of Petroleum Engineers, SPE 161086, 2012.

Shine et al., "Planning for a Necessary Evil in Deepwater Operations: Remedial Cementing", Society of Petroleum Engineers, SPE-170322-MS, 2014.

Turner et al., "Improved Thixotropic Barrier Fluid", Society of Petroleum Engineers, SPE/1ADC-184625-MS, 2017.

Examination Report dated Feb. 20, 2020 pertaining to GCC Patent Application No. GC 2018-36179.

* cited by examiner

THIXOTROPIC CEMENT SLURRY AND PLACEMENT METHOD TO CURE LOST CIRCULATION

CROSS REFERENCE TO RELATED APPLICATIONS

This application is a continuation of U.S. Pat. No. 10,415,330 filed Oct. 8, 2018, which claims the benefit of U.S. Provisional Application Ser. No. 62/570,383 filed Oct. 10, 2017.

TECHNICAL FIELD

Embodiments of the present disclosure generally relate to natural resource well drilling and, more specifically, to compositions and methods for isolating a lost circulation zone of a wellbore.

BACKGROUND

Extracting subterranean fuel sources may require drilling a hole from the surface to the subterranean geological formation housing the fuel. Specialized drilling techniques and materials are utilized to form the bore hole and extract the fuels. Specialized materials utilized in drilling operations include materials for sealing the casing-casing annulus of the wellbore, which may be formulated for specific downhole conditions.

A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may permit access between equipment on the surface and the interior of the wellbore. The fluid conduit may be defined by one or more tubular strings (for example, casings or tubings) inserted into the wellbore and secured in the wellbore.

During drilling of a wellbore, cementing the wellbore, or both, lost circulation zones may be encountered and may result in loss of drilling fluid or cementing compositions. In a lost circulation zone, the drilling fluid or cement composition flows out of the wellbore and into the surrounding subterranean formation. Lost circulation zones may result in increased cost of the well through increased material costs to replace lost fluids and downtime to remediate the lost circulation zone. Lost circulation zones may be remediated by introducing a lost circulation material into the lost circulation zone to seal off the lost circulation zone to prevent further fluid loss.

During well construction operations, conventional cement compositions and conventional placement methods used to isolate lost circulation zones often result in high fluid loss to the formation.

SUMMARY

Accordingly, there is a need for effective cement slurries and placement methods to form a cement plug to remediate or isolate lost circulation during well construction. This need is met by the combination of the present thixotropic cement slurry and the present placement method (also called "pump and pull placement method" hereinafter) for the thixotropic cement slurry, in which the thixotropic cement slurry comprises at least one cement, at least one viscosifier, mix water, and one or more than one strength accelerating additives.

In accordance with one embodiment, a method of reducing lost circulation in a wellbore is provided. The method comprises inserting a conduit comprising a first and second end and an outer diameter and an inner diameter into the wellbore, and pumping a thixotropic cement slurry through the conduit into the wellbore. As used herein, "thixotropic" means the thixotropic cement slurry will increase in viscosity with no shear and decrease in viscosity with shear, and have a power law exponent value of less than or equal to 0.3 when the thixotropic cement slurry has a density of greater than 12.69 pounds per gallon. The thixotropic cement slurry comprises at least one cement, at least one viscosifier, mix water, and one or more than one strength accelerating additives. The method further comprises allowing the thixotropic cement slurry to harden in the wellbore to create a plug, removing the conduit from the wellbore, and reducing lost circulation via the plug in the wellbore.

Without being limited by theory, these methods reduce the cement slurry costs by reducing the number of plugging attempts necessary to isolate losses in most wells, in turn allowing a value realization through lower rig non-productive time when compared to traditional plugging attempts. This methodology works in both onshore and offshore environments. The pump and pull enables the plug placement without excessive hydrostatic pressure and overbalance experienced with conventional methods.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used throughout this disclosure, the term "annulus" refers to a space between two concentric or eccentric objects, such as between the wellbore and casing or between casing and tubing, where fluid can flow.

As used throughout this disclosure, the term "blow out preventer," or BOP, refers to a large valve at the top of a well that may be closed if the drilling crew loses control of formation fluids. By closing this valve (usually operated remotely via hydraulic actuators), the drilling crew usually regains control of the reservoir, and procedures can then be initiated to increase the mud density until it is possible to open the BOP and retain pressure control of the formation. BOPs come in a variety of styles, sizes and pressure ratings. Some can effectively close over an open wellbore, some are designed to seal around tubular components in the well (drillpipe, casing or tubing) and others are fitted with hardened steel shearing surfaces that can actually cut through drillpipe. Since BOPs are critically important to the safety of the crew, the rig and the wellbore itself, BOPs are inspected, tested and refurbished at regular intervals determined by a combination of risk assessment, local practice, well type and legal requirements. BOP tests vary from daily function testing on critical wells to monthly or less frequent testing on wells thought to have low probability of well control problems.

As used throughout this disclosure, the term "borehole" refers to the wellbore itself, including the open hole or uncased portion of the well. Borehole may refer to the inside diameter of the wellbore wall, the rock face that bounds the drilled hole.

As used throughout this disclosure, the term "cementing head" refers to a device fitted to the top joint of a casing string allowing connection of a fluid circulation line from non-rig equipment.

As used throughout this disclosure, the term "choke" refers to a device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids.

As used throughout this disclosure, the term "choke line" refers to a high-pressure pipe leading from an outlet on the BOP stack to the backpressure choke and associated manifold. During well-control operations, the fluid under pressure in the wellbore flows out of the well through the choke line to the choke, reducing the fluid pressure to atmospheric pressure. In floating offshore operations, the choke and kill lines exit the subsea BOP stack and then run along the outside of the drilling riser to the surface. The volumetric and frictional effects of these long choke and kill lines must be considered to control the well properly.

As used throughout this disclosure, the term "diverter" refers to a conduit installed on the conductor casing to release fluid from the annulus and to divert flow from rig personnel and equipment in case of an unexpected influx of formation fluids during drilling.

As used throughout this disclosure, the term "drill string" refers to the combination of the drillpipe, the bottomhole assembly and any other tools used to place the cement in the wellbore.

As used throughout this disclosure, the term "fluid" may include liquids, gases, or both. As used throughout the disclosure, "spacer fluid" refers to a fluid utilized to space apart any two other materials utilized in well production.

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "kill line" refers to a high-pressure pipe leading from an outlet on the BOP stack to the high-pressure rig pumps. During normal well control operations, kill weight fluid is pumped through the drillstring and annular fluid is taken out of the well through the choke line to the choke, which drops the fluid pressure to atmospheric pressure. If the drillpipe is inaccessible, it may be necessary to pump heavy drilling fluid in the top of the well, wait for the fluid to fall under the force of gravity, and then remove fluid from the annulus. In such an operation, while one high pressure line would suffice, it is more convenient to have two. In addition, this provides a measure of redundancy for the operation. In floating offshore operations, the choke and kill lines exit the subsea BOP stack and run along the outside of the riser to the surface. The volumetric and frictional effects of these long choke and kill lines must be taken into account to properly control the well.

As used throughout this disclosure, the term "kill weight fluid" refers to a mud whose density is high enough to produce a hydrostatic pressure at the point of influx in a wellbore and shut off flow into the well. Kill weight mud, when needed, must be available quickly to avoid loss of control of the well or a blowout. Thus, it is usually made by weighting up some of the mud in the system or in storage by adding barite or hematite. Unless diluted in advance, the mud may become too thick and perhaps un-pumpable due to high solids loading. A weight-up pilot test can identify if and how much dilution will be needed in advance of adding weighting material to the mud in the pits.

As used throughout this disclosure, the term "liner" refers to a casing string that does not extend to the top of the wellbore, but instead is anchored or suspended from inside the bottom of the previous casing string.

As used throughout this disclosure, the term "mud weight" refers to the mass per unit volume of a drilling fluid and is synonymous with mud density. Mud weight controls hydrostatic pressure in a wellbore and prevents unwanted flow into the well. The weight of the mud also prevents collapse of the casing and the open hole. Excessive mud weight can cause lost circulation by propagating, and then filling fractures in the rock.

As used throughout this disclosure, the term "open hole" refers to the uncased portion of a well.

As used throughout this disclosure, the term "overbalanced" refers to a well wherein the hydrostatic pressure inside the open hole or casing or liner is greater than the reservoir pressure.

As used throughout this disclosure, the term "stand" refers to two or three single joints of drillpipe or drill collars that remain screwed together during tripping operations.

As used throughout this disclosure, the term "top drive" refers to a device that turns the drillstring. It consists of one or more motors (electric or hydraulic) connected with appropriate gearing to a short section of pipe called a quill, that in turn may be screwed into a saver sub or the drillstring itself. The top drive is suspended from the hook, so the rotary mechanism is free to travel up and down the derrick.

As used throughout this disclosure, the term "trip" refers to the act of pulling the drillstring out of the hole or replacing it in the hole. A pipe trip is usually done because the bit has dulled or has otherwise ceased to drill efficiently and must be replaced.

As used throughout this disclosure, the term "work string" is a generic term used to describe a tubing string or conduit in a well.

As stated previously, embodiments of the present disclosure are directed to a thixotropic cement slurry and methods of reducing lost circulation in a wellbore by utilizing the thixotropic cement slurry. The method comprises inserting a conduit comprising a first and second end and an outer diameter and an inner diameter into the wellbore, and pumping a thixotropic cement slurry through the conduit into the wellbore.

The thixotropic cement slurry comprises at least one cement, at least one viscosifier, mix water, and one or more than one strength accelerating additives. The method further comprises allowing the thixotropic cement slurry to harden in the wellbore to create a plug, removing the conduit from the wellbore, and reducing lost circulation via the plug in the wellbore.

The fluid conduit may be defined by a tubular string installed in the wellbore. The wellbore annulus has a volume defined between the external surface of the tubular string and the wellbore wall. As wellbore drilling continues and the wellbore extends deeper into the subterranean formation, one or more additional tubular strings may be installed within the fluid conduit defined by the initial tubular string. Additional tubular strings may have outer cross-sectional dimensions that are less than the inner cross-sectional dimensions of the tubular strings within which the additional tubular strings are disposed. Thus, the additional tubular string, when installed in the wellbore, may form a casing-casing annulus defined between the exterior surface of the additional tubular string and the interior surface of the tubular string surrounding the additional tubular string. Therefore, after drilling is complete and the wellbore is fitted with production tubing for production, the wellbore may comprise a plurality of tubular strings of progressively smaller cross-sectional dimensions that form a wellbore annulus and a plurality of casing-casing annuli.

Without being limited by theory, the primary use of a thixotropic cement slurry is for lost circulation mitigation during the drilling phase of wellbore construction. Lost circulation more commonly happens when the effective density of a circulating fluid during drilling exceeds the formation fracture pressure at the given depth. The density selection of the thixotropic slurry is on a case-by-case basis for the wellbore operating conditions. It is a function of the bottom hole pressure, temperature, mud weight, and loss rate.

The thixotropic cement slurry can be used for sealing the annulus or remediating a wellbore under a range of different downhole conditions in the wellbore. For example, in some embodiments, the thixotropic cement slurry may be adapted to different downhole conditions by modifying the density, viscosity, curing time, or other properties of the thixotropic cement slurry.

A conventional plug cement slurry is not thixotropic and thus has a flow behavior index of $1>n>0.3$ for a cement with a density greater than 12.69 ppg. A flow behavior index of less than 1 classifies a fluid as pseudo-plastic, and all cements will fall under this category. By comparison, the thixotropic cement slurry has a flow behavior index of $n<0.3$ for a cement with a density greater than 12.69 ppg.

The thixotropic cement slurry demonstrates thixotropic behavior when placed into the wellbore. Thixotropic behavior is characteristic of fluidity during dynamic conditions (induced forces) and rapid gel strength development when left static (no external forces). A viscosifier provides a minimum viscosity of the interstitial water within the matrix, stability to prevent settling, and primary component for thixotropic behavior. The strength accelerating additive may act as a secondary thixotropic modifier which complements the stability, improves the transition time (time from the liquid to gelled state), and controls the thickening time of the cement.

Various components for the cement, viscosifier, and strength accelerating additive are contemplated. The cement may include one or more of Portland cements, alumina cements, blast furnace slag cements and Pozzolanic cements. In a specific embodiment, the cement comprises Portland cement. The viscosifier may include one or more of hydroxyethylcellulose, carboxymethylcellulose, guar gum, hydroxypropylguar, xanthan gum, bentonite, hectorite and sepeolite bentonite. In a specific embodiment, the viscosifier comprises bentonite. Various amounts are contemplated for the viscosifier. For example, the viscosifer may be added to the mix water with concentrations ranging from 1 to 5% by weight of cement (BWOC) pre-hydrated.

The strength accelerating additive may comprise one or more of sodium chloride, calcium chloride, triethanolamine, sodium silicate, sodium metasilicate, and sodium aluminate. In a specific embodiment, the strength accelerating additive comprises sodium metasilicate, and sodium silicate. While various amounts are considered suitable, the strength accelerating additive can be added to the mix water with concentrations ranging from 0.5 to 3% BWOC pre-hydrated or from 2 to 15 gallons per hundred sacks of cement (gphs). The thixotropic cement slurry may also comprise mix water selected from least one of fresh water, low salt water, or seawater.

Due to the mix water quality, anti-foaming chemicals and dispersants may be added to the thixotropic cement slurry to achieve the performance properties of the slurry design. Retarders may also be added to adjust the thickening time. In some embodiments, the thixotropic cement slurry may have a density of from 12.0-15.0 ppg.

The thixotropic cement slurry may have a thickening time sufficient to allow the thixotropic cement slurry to be transferred or otherwise introduced to the wellbore, remediation zone, or other region of the wellbore before the buildup of viscosity is sufficient to cause transfer problems, such as inability to pump the thixotropic cement slurry.

Moreover, the thixotropic cement slurry may be capable of withstanding a wide range of temperatures and pressures. For example, the thixotropic cement slurry may be applicable in temperatures of from 4.4 degrees Celsius (° C.) to 121° C. The hardened thixotropic cement plug may be capable of withstanding pressures of up to 10,000 pounds of force per square inch (psi) (1 psi equals 6.895 kilopascals (kPa)).

The rheology and density of the thixotropic cement slurry can be adjusted over a wide range of values depending on the requirement for the well and the downhole conditions of the well. The final density of the thixotropic cement slurry may depend on the geology of the subterranean formation in the zone being sealed. The thixotropic cement slurry may have a density sufficient to enable the thixotropic cement slurry to exert hydrostatic pressure on the wellbore wall or interior surface of an outer casing to support the wellbore.

The thixotropic cement slurry may have a gel strength at bottom hole circulating temperature (BHCT) that is sufficient to maintain the pump-ability of the thixotropic cement slurry to prevent stuck-pipe problems. The gel strength refers to the shear stress of a fluid measured at a low shear rate following a defined period of time during which the fluid is maintained in a static state. In some embodiments, the gel strength of the slurry at 10 minutes may be greater than two times the gel strength of the slurry at 10 seconds. The 10-second gel strength and 10-minute gel strength may be measured according to the test methods subsequently described in this disclosure. The thixotropic cement slurry may have a shear stress of greater than 9 centipoise at 3 rotations per minute at bottom hole circulating temperature.

In further embodiments, the spacer fluid used in combination with the thixotropic cement slurry in the pump and pull method is an unweighted fluid modified for compatibility between both the wellbore fluid type (water based, oil based, synthetic based) and thixotropic cement slurry. The composition can be fresh water, sea water, or the primary component of the base oil with a surfactant package to ensure water wetting. The volumes of the spacer fluid can range from 50 to 400 barrels (bbl) depending on the severity of losses, wellbore fluid density, cement density and bottom hole conditions.

The pump and pull placement method is a placement technique to optimize the success of the hardened thixotropic cement slurry plug curing the losses in the wellbore. This method utilizes a spacer fluid in combination with the thixotropic cement slurry. It can be executed through the drilling bottom hole assembly or work string and incorporates manipulation of the top drive and diverter or blow out preventer. There are specific calculations that are required to ensure the plug placement success using the pump and pull method. This method works for all wellbore trajectories including vertical, deviated, and horizontal.

Figure 1A:
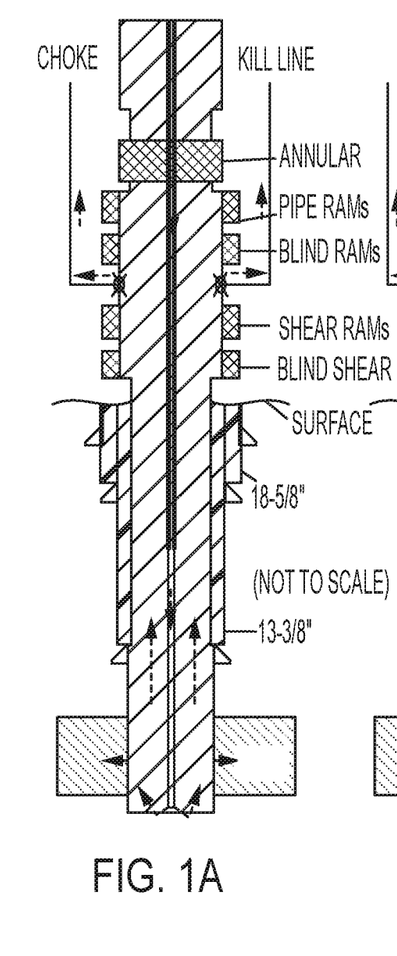
FIGS. 1A-1D are schematic illustrations depicting the pump and pull method according to one or more embodiments of the present disclosure.
Figure 1B:
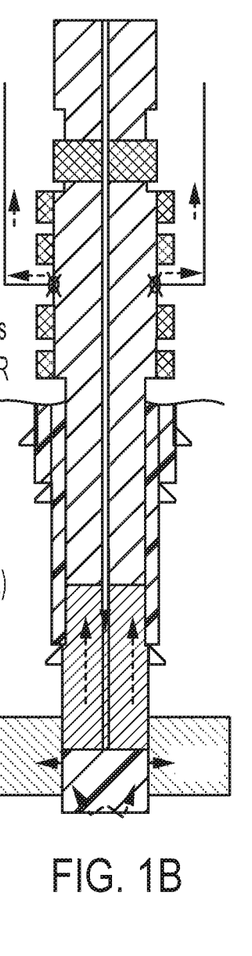
Figure 1C:
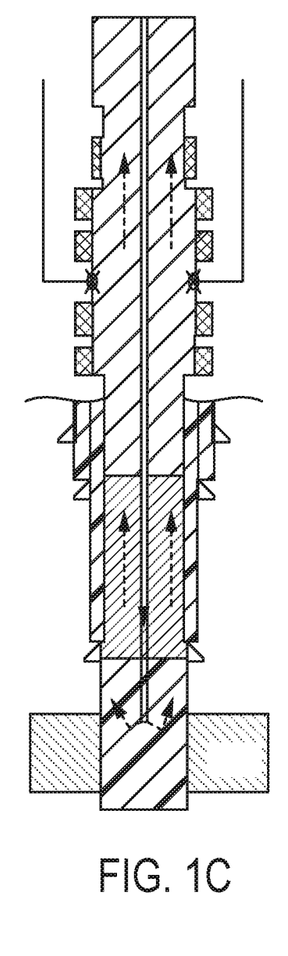
Figure 1D:
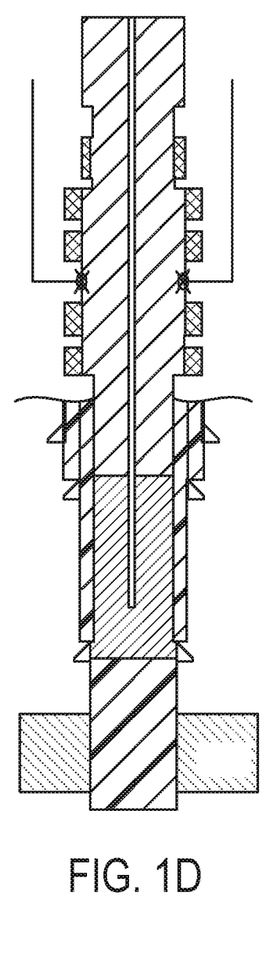

The conventional placement method includes a conduit placed at a fixed depth in the wellbore, through which a spacer fluid and cement is pumped into the annulus. These fluids are displaced by a trailing spacer and displacement fluid. The conduit does not move throughout the placement and the placement is complete when the fluid levels inside and outside the conduit are at the balance point. Without being limited to examples, the pump and pull placement method may be executed in exemplary embodiment as follows:
1. Position end of work string at a specified depth at or above loss zone, as schematically depicted in FIG. 1A.
2. Ensure surface blow out preventer lines are up to take returns through the choke and/or kill line or diverter, then close annular rams.
3. Pump a given volume of linear spacer fluid at a given rate.
4. Spot Pvac of selected density thixotropic cement at a given rate, as schematically depicted in FIG. 1B.
5. Pump a given volume of linear spacer fluid at a given rate.
6. Pump calculated volume of wellbore fluid to displace until 30% of Pvac have exited the work string.
7. Stop pumping.
8. Open annular rams. Close diverter or choke and/or kill lines.
9. Simultaneously break the cementing stand off and connect Top Drive to work string.
10. Resume displacement with rig at Qpnp while pulling stands 15 feet/minute as schematically depicted in FIG. 1C.
11. Pull each stand, break connection, rack back, then reconnect top drive on rig floor
12. Repeat for Spnp-s stands.
13. Pull out of hole five additional stands and wait on cement to achieve a given compressive strength as schematically depicted in FIG. 1D.

The calculations for the pump and pull placement method begin with selecting the appropriate work string size proportionate to the open hole size. The open hole size can vary from 6⅝" to 2⅞". In one embodiment, the work string selection focuses on a 2.25 ratio of the likely open hole size (including washout) to work string across the cement plug, where work string size rounded up to the maximum work string size available.

$$W_{sod} = \frac{OH_{eq}}{2.25}$$

Where:
$W_{sod}$=size of the work string outside diameter, inches (")
$OH_{eq}$=equivalent open hole size, (")

Then the plug volume inside the selected work string, from surface to the ending depth of the work string for the plug placement is calculated.

$$W_{sv} = \left[\left[\frac{(W_{sid})^2}{1029.45}\right] * (W_{std} - W_{srkb})\right] - 5$$

Where:
$W_{sv}$=volume of the work string, bbl
$W_{sid}$=inside diameter of the work string, (")
$W_{std}$=depth of the work string at total depth, feet (ft)
$W_{srkb}$=depth of the work string at surface, ft The work string volume may be divided by a factor of 0.7 to get the maximum volume of cement plug possible.

$$P_{vmax} = \frac{W_{sv}}{0.70}$$

Where:
$P_{vmax}$=maximum plug volume that can be performed, bbl

From this known maximum volume, the actual volume planned in the open hole is determined—usually a function of length.

The next series of calculations are the pump rate. These calculations are based on the annular capacity of the likely open hole size including washout to work string across the cement plug (i.e. 14" OH equivalent to 5.5" work string).

$$C_{ann} = \left[\frac{(OH_{eq})^2 - (W_{sod})^2}{1029.45}\right]$$

Where:
$C_{ann}$=annular capacity of the equivalent open hole and work string, bbl per ft.

With the annular capacity, the optimum pump and pull rate of 15 ft per minute helps determine the surface pump rate. This is the quotient of 15 ft per minute and the annular capacity in bbl per minute.

$$Q_{pmp} = C_{ann} * 15 \text{ feet per minute}$$

Where:
$Q_{pmp}$=pump and pull displacement rate, bbl per minute

The last part of the calculations is to determine how many 90 foot stands, or three consecutive joints of drillpipe, need pulling to complete the placement and ensure the work string has cleared the cement in the borehole. In specific embodiments, 70% of the total plug volume may be the volume left in the work string before starting the pump and pull technique. This determines the volume of cement and the resulting length inside the work string.

$$P_{vip} = P_{vac} * 0.70$$

Where:
$P_{vac}$=actual total plug volume required from planned length in borehole, bbl
$P_{vip}$=volume of total plug volume left inside the work string, bbl Then the volume pumped during the pumping and pulling of a 90-foot stand is determined by multiplying 90 ft by the pump rate divided by the pull rate.

$$P_{vpmp} = \left(\frac{90 \text{ feet}}{15 \text{ feet per minute}}\right) * Q_{pnp}$$

Where:

$P_{vpmp}$=volume of cement displaced during pulling of one 90-foot stand, bbl

This volume uses the following relationship with the Pvip to identify the number of stands to pull.

$$S_{pmp} = \left(\frac{P_{vip}}{P_{vpnp}}\right)$$

Where:

$S_{pnp}$=minimum 90-foot stands to be pulled, stands

Add a safety factor of 2 stands to conclude the total number of pulled 90-foot stands to set the plug in place.

$$S_{pmp-s} = S_{pmp} + 2$$

Where:

$S_{pnp-s}$=minimum 90-foot stands to be pulled with safety factor, stands

In some embodiments, the method may further include letting the slurry harden, for example, for at least 3 hours. In some embodiments, the spacer fluid and the thixotropic cement slurry may be introduced to the wellbore through the drill string.

Additionally, in some embodiments, the method may include determining the volume and densities of the spacer fluid. The method may further include determining the density, volume, or both of the thixotropic cement slurry to be pumped to isolate the weak zones.

In some embodiments, the drill string inner diameters can range from 5.875" to 2.441". In some embodiments, the drill string can have variable inner and outer diameters that change along the length of the pipe. In some embodiments, the drill string can bend or deform as it is subjected to higher pressures and temperatures.

In some embodiments, the size of the open hole can range from 36" to 5⅞".

Once the thixotropic cement slurry has cured into a solid plug, drilling the wellbore may re-commence. In some embodiments, the drill string and drill bit may be used to drill through at least a portion of the plug to continue drilling the wellbore.

Test Methods

The gel strength refers to the shear stress of the thixotropic cement slurry measured at a low shear rate following a defined period of time during which the thixotropic cement slurry is maintained in a static state. The shear stress of the thixotropic cement slurry at low shear rate may be measured using a standard oilfield rotational viscometer operated at a low rotor speed, typically 3 rpm, according to the test methods described in API Recommended Practice On Testing Well Cements (RP 10B-2).

EXAMPLES

The following examples illustrate one or more features of the present disclosure. It should be understood that these examples are not intended to limit the scope of the disclosure or the appended claims in any manner.

Example 1: Example Pump and Pull Method

Another embodiment of the pump and pull method in an overbalanced well is described as follows:

1. Open choke and kill lines.
   Manipulation of the blow out preventer (BOP) to divert the well annular flow path of the fluids towards orifices that have a smaller cross sectional area for flow. This contributes to controlling the free fall effect by applying back pressure if and when circulation is regained during the cement placement using the pump and pull method.
2. Close Annular.
   Closing the conventional well annular flow path which is considered an open annulus with no restrictions to flow.
3. Pump 350 bbl drill water ahead at 4 bpm.
   This is a calculated volume to reduce the hydrostatics across the loss zone during and after cement placement. This is an important step in the methodology. The formation sees a column full of water down the work string and believes the hydrostatics are being reduced to its balance point. Here it works to divert the flow up the annulus rather than into the loss zone. This usually helps contribute to regaining circulation enough to enable the cement slurry to be placed into the wellbore versus into the loss zone.
4. Pump 100 bbl of 112 pcf cement at 4 bpm.
   This is a calculated volume for the cement plug as a function of the equivalent open hole size. What is also important is that of this volume, 30% will be pumped outside the work string prior to commencing pump and pull operations. The remaining volume will be placed, in layers like stacking pancakes, on top of this volume. This is how the pump and pull works. It reduces the hydrostatics the loss zone experiences while stacking up the cement in different layers to build up the plug. Conventionally you are continuously pressure pumping the cement plug in place which is feeding the loss zone and essentially pumping away to the loss zone. Pump and pull methods works to prevent this.
5. Pump a calculated amount of drill water behind to balance (about 50 bbl) at 4 bpm.
   This is the same linear fluid used in the spacer fluid ahead but enough volume to balance and ensure the hydrostatic pressure transmitted at the end of the job is at or below the loss zone. This volume changes depending on actual well operations and conditions.
6. Pump a calculated amount of 68 pcf mud weight to complete displacement at 4 bpm.
   The volume of mud behind is part of the balance calculations noted above. It is the last fluid pumped into the well before the pump and pull operations begin. The volume is also changing depending on actual well operations and conditions.
7. When 30 bbl has exited the work string, shut down.
8. Open annular, close choke and kill lines.
   It is not advised to perform pulling operations on the conduit while having the annulus closed. This is referred to as "stripped" and only advised for well control pumping. The next step is to open the annulus and close the restricted flow paths.
9. Simultaneously break cementing stand off and tie-in top drive.
   Rig down the cementing head and connections used to place the cement and rig up the top drive to the work string as the rig will pump the mud into the work string while pulling the work string out of the wellbore.

10. Simultaneously resume displacement at 2 bpm while pulling stands at 17 feet per minute.

This step is a result of the balance calculation to match the pump rate with the pull rate. It assumes a fixed volume of the cement is in the annulus. From this it adds the layers into the existing plug stacking it higher in the hole further isolating the loss zone.

11. Continue until clearing top of cement by 2 stands.

This is a safety measure to ensure all of the cement is below the work string and is clear.

12. Pick up 5 stands then reverse out 1 annular volume (~700 bbl).

This is a safety measure to ensure all of the cement is below the work string and nothing will be found in the annulus.

13. Shut in backside and monitor pressure.

Example 2: Comparative Data

A cement slurry was tested for thickening time and fluid loss in order to evaluate the performance of cement slurry. The cement slurry included Portland cement, 2% BWOC bentonite, and 1% BWOC sodium metasilicate, and 0.38% BWOC retarder. The cement slurry had a density of 13.5 ppg and a slurry yield of 1.71 ft$^3$/sks.

Figure 2:
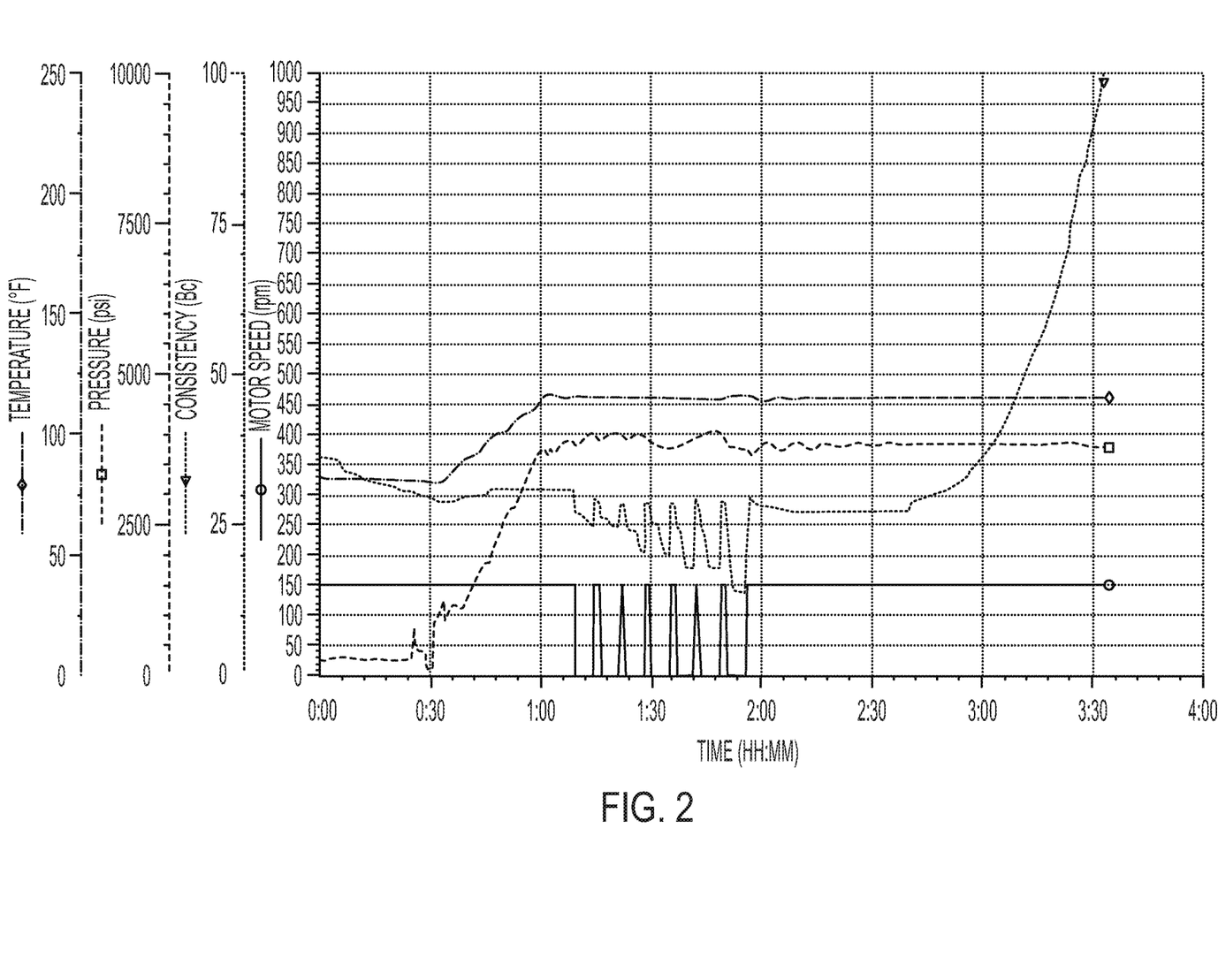
FIG. 2 is a graphical illustration of the performance of the thixotropic cement slurry by plotting the temperature, pressure, consistency, and motor speed versus time, according to one or more embodiments described in this disclosure.

FIG. 2 shows the thickening time test of a thixotropic cement at 101 pounds per cubic feet (pcf) (13.5 pounds per gallon (ppg)) tested on an API modified schedule. The results of this thickening time test are provided in Table 1.

TABLE 1

Thixotropic cement slurry thickening time:

| Consistency | Thickening time Time |
|---|---|
| 102 Bearden units of consistency (Bc) | 3:34 hrs |

The compositions of the conventional cement slurry and the thixotropic cement slurry are compared in Table 2.

TABLE 2

Cement slurry compositions:

| | Conventional Cement Slurry | Thixotropic Cement Slurry |
|---|---|---|
| Density (ppg) | 12.7-15.0 | 13.5 |
| Cement (% BWOC) | 100 | 100 |
| Bentonite (% BWOC) | 0-1.5 | 2 |
| Sodium metasilicate (% BWOC) | 0 | 1 |
| Sodium silicate (gphs) | 0 | 0 |
| Retarder (% BWOC) | 0 | 0.38 |
| Flow behavior index, n | 0.3 < n < 1 | n ≤ 0.3 |

Different slurries and different placement methods were tested together on the same well. The results of this test are shown in Table 3.

TABLE 3

Summary of cement plug events on the same well:

| Plug No. | Slurry Type | Placement Method | Result |
|---|---|---|---|
| 1 | Conventional | Conventional | No zonal isolation |
| 2 | Conventional | Conventional | No zonal isolation |
| 3 | Conventional | Pump and Pull | No zonal isolation |
| 4 | Thixotropic | Pump and Pull | Zonal isolation |

Non-thixotropic plug numbers 1 and 2 were each pumped into the hole separately and at different times and left to harden. When the rig ran pipe down the hole to find the top of the cement plug, the drillpipe did not encounter any cement at the appropriate depth and there were no returns to surface. Therefore, there was no zonal isolation. Non-thixotropic plug number 3 was placed in the hole using the pump and pull method instead of the conventional placement method. However, as with plugs 1 and 2, the drillpipe did not encounter any cement at the appropriate depth and there were no returns to surface, so plug number 3 also failed to demonstrate zonal isolation.

Plug number 4, composed of the thixotropic cement slurry, was pumped into the hole using the pump and pull placement method and left to harden. When the rig ran pipe down the hole to find the top of the cement plug, the drillpipe encountered plug number 4 at the appropriate depth and with no dynamic fluid losses. The rig then circulated more drilling mud downhole, flow checked the well, and determined that the well was static. Therefore, the thixotropic cement slurry placed using the pump and pull method successfully created zonal isolation.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

The presently described subject matter may include one or more aspects, which should not be regarded as limiting on the teachings of the present disclosure. A first aspect may include a method of reducing lost circulation in a wellbore comprising: inserting a conduit comprising a first and second end and an outer diameter and an inner diameter into the wellbore; pumping a thixotropic cement slurry, wherein the thixotropic cement slurry will increase in viscosity with no shear and decrease in viscosity with shear, and have a power law exponent value of less than or equal to 0.3 when the thixotropic cement slurry has a density of greater than 12.69 pounds per gallon, through the conduit into the wellbore, in which the thixotropic cement slurry comprises at least one cement, at least one viscosifier, mix water, and one or more than one strength accelerating additives; allowing the thixotropic cement slurry to harden in the wellbore to create a plug; removing the conduit from the wellbore; and reducing lost circulation via the plug in the wellbore.

Another aspect includes any of the previous aspects, in which the conduit is a pipe and the inner diameter has a range of 2.551" to 5.875".

Another aspect includes any of the previous aspects, in which the cement comprises Portland cement.

Another aspect includes any of the previous aspects, in which the viscosifier comprises bentonite.

Another aspect includes any of the previous aspects, in which the strength accelerating additive comprises at least one of sodium silicate or sodium metasilicate.

Another aspect includes any of the previous aspects, in which the thixotropic cement slurry further comprises at least one dispersant, at least one antifoaming agent, or at least one retarder.

Another aspect includes any of the previous aspects, in which the thixotropic cement slurry has a shear stress of greater than 9 centipoise at 3 rotations per minute at bottom hole circulating temperature.

Another aspect includes any of the previous aspects, in which the gel strength of the thixotropic cement slurry at bottom hole circulating temperature at 10 minutes is greater than twice the gel strength of the slurry at 10 seconds.

Another aspect includes any of the previous aspects, in which the thixotropic cement slurry mix water comprises at least one of fresh water, low salt water, or seawater.

Another aspect includes any of the previous aspects, in which the thixotropic cement slurry comprises bentonite ranging from 1 weight percent to 5 weight percent of cement pre-hydrated.

Another aspect includes any of the previous aspects, in which the thixotropic cement slurry comprises sodium metasilicate ranging from 0.5 weight percent to 3 weight percent of cement pre-hydrated.

Another aspect includes any of the previous aspects, in which the plug has a maximum volume calculated by dividing a volume of the conduit by a factor of 0.7.

Another aspect includes any of the previous aspects, in which the outer diameter of the conduit is equal to a diameter of the wellbore divided by 2.25.

Another aspect includes any of the previous aspects, in which the diameters of the conduit vary along a length of the conduit.

Another aspect includes any of the previous aspects, in which the conduit may bend at high pressure and high temperature.

Another aspect includes any of the previous aspects, in which the conduit is inserted to a specified depth at or above a loss zone.

Another aspect includes any of the previous aspects, in which a spacer fluid is pumped through the conduit prior to pumping the thixotropic cement slurry.

Another aspect includes any of the previous aspects, in which the spacer fluid is pumped into the conduit following the thixotropic cement slurry.

Another aspect includes any of the previous aspects, in which pumping the thixotropic cement slurry through the conduit is followed by pumping a drilling mud through the conduit.

Another aspect includes any of the previous aspects, in which the conduit is removed while pumping one of the thixotropic cement slurry, the drilling mud, or the spacer fluid through the conduit until the second end of the conduit is above the plug.

Another aspect includes any of the previous aspects, in which the drilling mud pumps down the wellbore outside the conduit and then flows up the conduit.

What is claimed is:

1. A method of reducing lost circulation in a wellbore comprising:
    inserting a conduit comprising a first and second end and an outer diameter and an inner diameter into the wellbore, in which the conduit is a pipe and the inner diameter has a range of 2.551" to 5.875";
    pumping a thixotropic cement slurry through the conduit into the wellbore, wherein:
        the thixotropic cement slurry will increase in viscosity with no shear,
        the thixotropic cement slurry will decrease in viscosity with shear, and
        the thixotropic cement slurry will have a power law exponent value of less than or equal to 0.3 when the thixotropic cement slurry has a density of greater than 12.69 pounds per gallon, and
        the thixotropic cement slurry comprises:
            at least one cement,
            bentonite in an amount ranging from 1 weight percent to 5 weight percent of cement,
            mix water, and a strength accelerating additive consisting of sodium meta-silicate in an amount ranging from 0.5 weight percent to 3 weight percent of cement;

allowing the thixotropic cement slurry to harden in the wellbore to create a plug, in which the plug has a maximum volume calculated by dividing a volume of the conduit by a factor of 0.7;

removing the conduit from the wellbore; and reducing lost circulation via the plug in the wellbore.

2. The method of claim 1, in which the cement comprises Portland cement.

3. The method of claim 1, in which the thixotropic cement slurry further comprises at least one dispersant, at least one antifoaming agent, or at least one retarder.

4. The method of claim 1, in which the thixotropic cement slurry has a shear stress of greater than 9 centipoise at 3 rotations per minute at bottom hole circulating temperature.

5. The method of claim 1, in which the thixotropic cement slurry has a gel strength at 10 minutes at bottom hole circulating temperature greater than twice the gel strength at 10 seconds at bottom hole circulating temperature.

6. The method of claim 1, in which the thixotropic cement slurry comprises at least one of fresh water or seawater.

7. The method of claim 1, further comprising inserting the conduit to a specified depth at or above a loss zone.

8. The method of claim 1, further comprising pumping a spacer fluid through the conduit prior to pumping the thixotropic cement slurry.

9. The method of claim 1, further comprising pumping a spacer fluid through the conduit following the thixotropic cement slurry.

10. The method of claim 1, further comprising pumping the thixotropic cement slurry through the conduit and pumping a drilling mud through the conduit.

11. The method of claim 1, further comprising removing the conduit while pumping at least one of the thixotropic cement slurry, a drilling mud, or a spacer fluid through the conduit until the second end of the conduit is above the plug.

12. The method of claim 1, further comprising pumping a drilling mud down the wellbore outside the conduit such that the drilling mud flows up the conduit.

13. A method of reducing lost circulation in a wellbore comprising:

inserting a conduit comprising a first and second end and an outer diameter and an inner diameter into the wellbore, in which the conduit is a pipe and the inner diameter has a range of 2.551" to 5.875";

pumping a thixotropic cement slurry through the conduit into the wellbore, wherein:
the thixotropic cement slurry will increase in viscosity with no shear,
the thixotropic cement slurry will decrease in viscosity with shear,
the thixotropic cement slurry will have a power law exponent value of less than or equal to 0.3 when the thixotropic cement slurry has a density of greater than 12.69 pounds per gallon, and
the thixotropic cement slurry comprises at least one cement, at least one viscosifier, mix water, and a strength accelerating additive consisting of sodium meta-silicate in an amount ranging from 0.5 weight percent to 3 weight percent of cement;

removing the conduit while pumping the thixotropic cement slurry through the conduit;

allowing the thixotropic cement slurry to harden in the wellbore to create a plug, in which the plug has a maximum volume calculated by dividing a volume of the conduit by a factor of 0.7; and reducing lost circulation via the plug in the wellbore.

14. The method of claim 13, further comprising ceasing pumping the thixotropic cement slurry before allowing the thixotropic cement slurry to harden in the wellbore to create a plug.

15. The method of claim 14, in which after ceasing pumping the thixotropic cement slurry, the second end of the conduit is at least a foot above a top of the thixotropic cement slurry.

16. The method of claim 13, in which:
the viscosifier comprises bentonite in an amount ranging from 1 weight percent to 5 weight percent of cement.

17. The method of claim 13, further comprising pumping the thixotropic cement slurry through the conduit and pumping a drilling mud through the conduit.

* * * * *